United States Patent Office 3,348,098
Patented Oct. 17, 1967

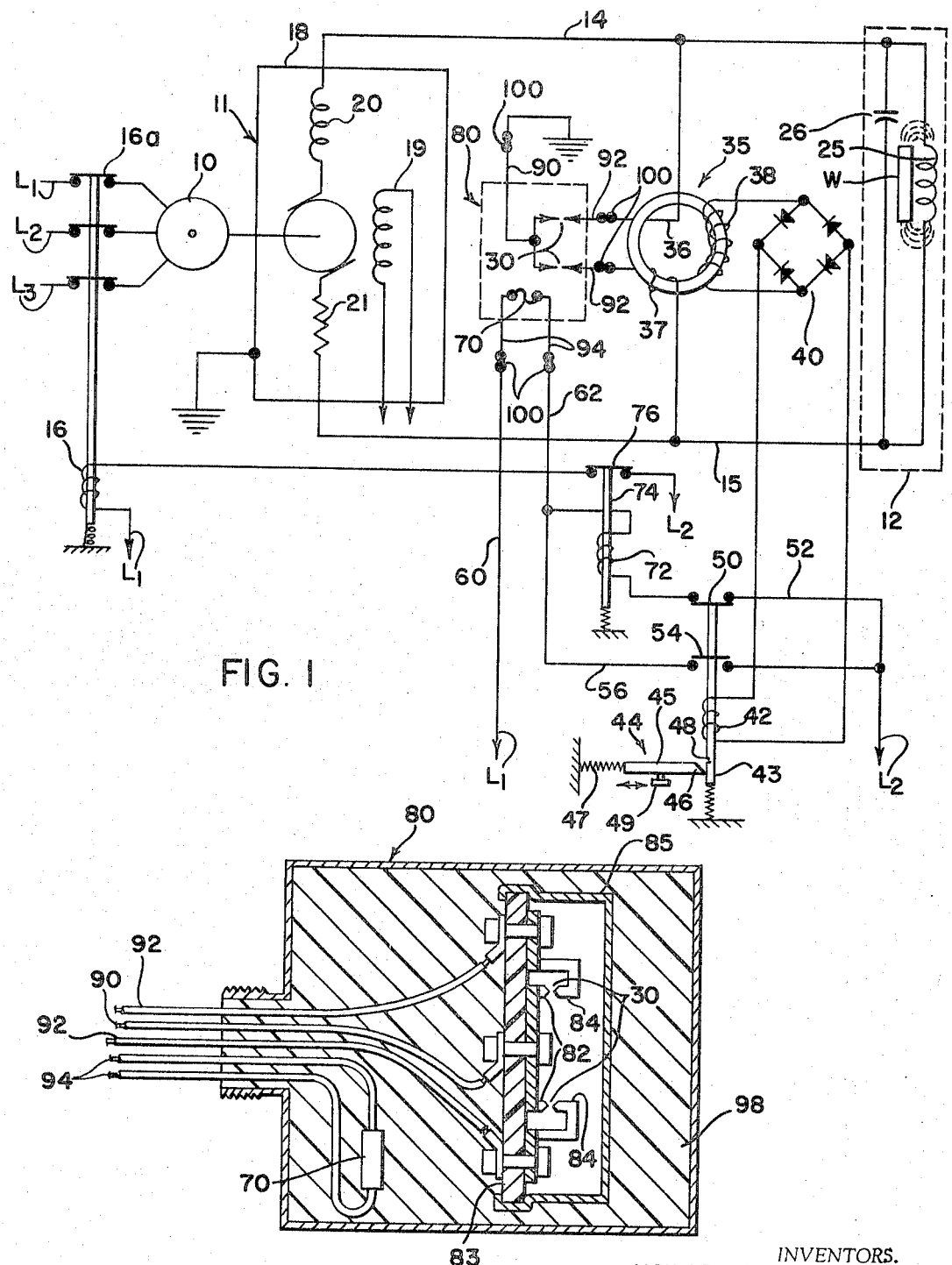

3,348,098
SURGE PROTECTOR FOR HIGH FREQUENCY
POWER SYSTEM
Howard D. Hausenfleck, Southfield, Mich., and Gary M.
Brittain, Cleveland, and Peter J. Tsivitse, Euclid, Ohio,
assignors to The Ohio Crankshaft Company, Cleveland,
Ohio, a corporation of Ohio
Filed Feb. 26, 1965, Ser. No. 435,590
5 Claims. (Cl. 317—13)

This invention pertains to the art of high frequency power systems and more particularly to a surge protector for a high frequency power system wherein inductances and capacitance are connected in the load circuit thereof.

The invention is particularly applicable to high frequency induction heating and it will be described with particular reference thereto; however, it will be appreciated that the invention has much broader applications and may be used in other high frequency power systems, such as high frequency systems for dielectric heating and ultrasonic applications.

In the induction heating art, high frequency alternators are ordinarily employed as the high frequency power source, particularly when large amounts of electrical power are required, i.e., over 20 kilowatts. The load circuits of these alternators normally include an induction heating coil and condensers in parallel therewith.

The high frequency alternators normally employed have an internal inductance which, under certain conditions of loading, can develop sufficiently high voltages across the output terminals of the alternator or between the terminals of the alternator and the frame of the alternator to damage the electrical insulation on the various components of the alternator.

For instance, if the inducing coil should be connected to the alternator when no workpiece is positioned within the coil, the voltage may possibly rise to abnormally high values.

The situation is particularly detrimental if the load circuit is connected to the alternator when the inducing coil is disconnected, when the coil has an open turn or when the conductor of the inducing coil breaks under load. In these situations, the condensers, which remain in the load circuit, may form a resonant or near resonant condition with the internal inductance of the alternator at the alternator output frequency. As is known, alternating current circuits, containing both inductive reactance and capacitive reactance that are equal or nearly equal at the frequnecy of the alternating current, can develop extremely high alternating current over-voltages. These over-voltages can be many times that of the output voltage of the alternator and can damage the insulation within the alternator. For the purpose of this application, an "over-voltage" indicates a voltage within the system that is greater than the maximum voltage desirable between the leads or between the leads and the frame of the alternator.

Various devices have been proposed for preventing this voltage build-up in the alternator of an induction heating power system. The most successful of these devices is described in United States Letters Patent No. 2,817,793 to Tudbury et al. Basically, the system disclosed in this prior patent includes a spark gap between the power leads and the frame of the alternator and means responsive to current flow through one or more of these spark gaps for de-energizing the alernator. Such a device operates rapidly and effectively prevents damage to the alternator upon the occurrence of over-voltages within the power system. Even though the spark gap surge protector disclosed in this patent has proven satisfactory in use, there is one distinct disadvantage in utilizing this particular surge protector.

In a system using a spark gap surge protector as disclosed in the prior Tudbury patent, the alternator of the type described herein causes a spark across one or more of the spark gaps. When this happens, the alternator is automatically shut down and held in the de-energized condition by an appropriate hold-out relay. Since the elements forming the spark gap within the surge protector can be destroyed by a single spark across the gap, the operator of the alternator is instructed that, when the surge protector shuts down the alternator, he should correct the cause of the over-voltage and then replace the spark gap unit of the surge protector. Thereafter, the hold-out relay can be manually reset and the alternator can be safely operated.

It has been found that the operator often manually resets the hold-out relay without replacing the spark gap elements of the surge protector. Although this sometimes may be done once or twice without serious difficulty, eventually the spark gap elements become defective to the extent that they will not pass a spark, even when subjected to extreme over-voltages. When this happens, the power system is completely unprotected from surges. This is especially dangerous because the operator believes that the surge protector is operating and that the system is protected. Consequently, it has been found in practice that alternators have been severely damaged by over-voltage, even though a surge protector was incorporated within the circuit. This damage results in expensive repairs and down time for the induction heating system. Also, without an effective surge protector, over-voltages can pose a certain amount of hazards to an operator.

These disadvantages of the prior spark gap surge protector for a high frequency power system are completely overcome by the present invention which is directed toward an improvement in the spark gap surge protector defined above.

In accordance with the present invention, there is provided a spark gap surge protector of the general type described that includes a fuse which is destroyed upon each actuation of the surge protector. This fuse must be replaced before the alternator, or other power source, can be re-energized. In accordance with the invention, this destructible fuse is physically attached to and inseparable from the container holding the spark gap elements of the surge protector. Consequently, upon each actuation of the surge protector by a spark across the spark gap elements, the fuse is destroyed and the only way that the fuse can be replaced is by replacing the container including the spark gap elements. This eliminates any possibility of utilizing a spark gap surge protector having defective spark gap elements.

In accordance with a more specific aspect of the present invention there is provided an improvement in a spark gap surge protector of the type described which improvement comprises a disposable container removably secured with respect to the alternator or power source, the spark gap forming elements being permanently housed within the container, a destructive fuse means for blocking energization of the power source when the fuse means is destroyed, and means for destroying the fuse means in response to current flow across one or more of the spark gaps, with the fuse means being permanently affixed with respect to the container.

The primary object of the present invention is the provision of a spark gap surge protector for protecting a high frequency power system from damage by over-voltages which protector is economical to produce and safe in operation.

Another object of the present invention is the provision of a spark gap surge protector for protecting a high frequency power system from damage by over-voltages which protector includes one or more spark gaps within a container which pass current when the system is subjected to over-voltages and a fuse that is incapacitated upon current flow through the spark gaps, with the fuse being permanently affixed with the container.

These and other objects and advantages will become apparent from the following description used to illustrate the preferred embodiment of the invention as read in connection with the accompanying drawing in which:

FIGURE 1 is a wiring diagram illustrating, somewhat schematically, the preferred embodiment of the present invention; and, FIGURE 2 is an enlarged, cross-sectional view showing, somewhat schematically, the preferred embodiment of the present invention.

Referring now to the drawing wherein the showings are for the purpose of illustrating a preferred embodiment of the invention only and not for the purpose of limiting the invention, FIGURE 1 shows a motor 10, a high frequency alternator 11 mechanically coupled to the motor 10 and a load circuit 12 electrically connected to the output terminals of the alternator 11 by suitable bus bars or power leads 14, 15.

The motor 10 is shown as a conventional three-phase, alternating current, induction motor connected to the power lines $L_1$, $L_2$ and $L_3$ through the normally open contacts 16a of a relay 16. Obviously, the motor 10 could be any known type of prime mover or could be a single-phase alternating current motor.

The high frequency alternator 11 includes a frame 18, a field coil 19, an armature or output winding, indicated as having an inductance 20, and a resistance 21, in series with the output of the alternator 11. Actually, the inductance 20 and the resistance 21 will be somewhat evenly distributed over the entire output winding and they are shown as lumped impedances in the wiring diagram for the purpose of simplicity. The output voltage of the alternator 11; that is, the voltage across the wires 14 and 15, will be, as is conventional in the art, determined by the characteristics of the alternator 11 and the voltage across the field coils 19.

The load circuit 12 is comprised generally of an induction heating coil 25 which is inductively coupled with a workpiece W. The terminals of the coils 25 are connected onto the power leads 14, 15 of the alternator 11, substantially as shown in FIGURE 1. Additionally, a capacitor 26 is connected in parallel with the heating coil 25 and has a capacitive reactance generally equal to the inductive reactance of the coil 25 when the workpiece W is magnetically coupled thereto.

The condenser 26 compensates for the high inductive reactance of the heating coil 25 so that the power factor of the load circuit 12, on the alternator, will be approximately unity.

If the workpiece W were not magnetically coupled with the coil 25 or if one of the power leads to the coil 25 were accidentally broken, the condenser 26 will be in electrical series with the inductance 20 of the alternator output winding. If the capacitive reactance of the condenser 26 is equal to or nearly equal to the inductive reactance of the inductance 20, at the output frequency of the alternator, a resonant condition will result wherein extremely high voltages can be developed, both across the condenser and across the inductance 20. It is quite possible to have extremely high voltages developed almost instantaneously throughout the system and, in particular, from one output terminal of the alternator 11 to the frame 18. Consequently, the electrical insulation of the alternator will break down and require repairs. The high voltages are also very dangerous to personnel nearby.

To prevent damage from these over-voltages, a spark gap 30 is connected from each terminal of the alternator 11 to the frame 18. These spark gaps 30 are adjusted so they break down at a voltage in excess of the normal output voltage of the alternator 11. This break down voltage is less than the voltage which will damage the insulation of the alternator 11. For a 600-volt alternator, a break down voltage of from 1,000 to 1,300 volts for the spark gaps has been found to be satisfactory. It will be noted that two spark gaps 30 are provided, one between each terminal of the alternator 11 and the frame 18.

A current transformer 35 of the iron-core type is provided having a primary winding 36 in series with the upper spark gap 30, and a primary winding 37, in series with the lower spark gap. In addition, the current transformer includes a secondary winding 38, the output terminals of which are connected onto the A.C. input terminals of a full-wave, alternating current rectifier 40. The output terminals of the rectifier 40 are connected onto the actuating coil 42 of a latching type relay 43. The latching mechanism 44 for relay 43 includes a keeper 45 having a tip 46 which is biased by spring 47 toward latch notch 48. A handle, or other element, 49 is used for manually resetting relay 43 so that the relay may be reset without electrical power. This eliminates all hazards to the operator in resetting the surge protector for subsequent use.

As the latching relay moves downwardly, the spring 47 forces the tip 46 into the notch 48 to hold the same in place until the handle 49 is subsequently retracted manually. Latching relay 43 includes a normally closed contact 50 in line 52 between power leads $L_1$, $L_2$ and a normally opened contact 54 in line 56 between the same power leads. Lines 52, 56 are electrically parallel and are in series with lines 60, 62. Lines 60, 62 includes a destructible fuse 70, which will be hereinafter described in detail. Also within line 52 there is provided a relay coil adapted to actuate relay 74 having normally open contacts 76. Upon actuation of relay 74, contacts 76 are closed and relay 16 is energized to close starting contacts 16a.

Referring now to FIGURE 2, in accordance with the present invention, a container 80 is removably secured with respect to the alternator 11 and includes spark gap forming elements 82, 84 which are supported on an insulation block 86. Elements 82, 84 are housed within a cover 85 to prevent ingress of deleterious substances. Spark gap forming elements 82 are connected onto a single lead 90 which protrudes outwardly from the container 80 and is connected to ground potential, as is shown in FIGURE 1. In a similar manner, the spark gap forming elements 84 are connected onto leads 92 protruding outwardly from container 80 and electrically connected onto primaries 36, 37 of transformer 38.

In accordance with the invention, the fuse 70, which may take a variety of structural forms, so long as the fuse is destroyed or otherwise incapacitated by a single spark across the gap, is permanently secured with respect to the container 80. In accordance with the illustrated embodiment of the present invention, the fuse is secured within the container; however, it is appreciated that the fuse may be permanently secured to the outside of the container so long as the container and the fuse are formed into a single component which cannot be replaced separately. The fuse 70 is connected onto leads 94 which protrude outwardly from the container and are connected onto lines 60, 62 as shown in FIGURE 1. In accordance with the illustrated embodiment of the present invention, the fuse 70 and the spark gap forming elements are secured within housing 85 by a common potting material 98. This potting material may take a variety of forms as long as the necessary physical and electrical characteristics are provided.

Referring again to FIGURE 1, the leads 90, 92 and 94 are secured onto the other elements of the high frequency system by a plurality of removable couplings 100. These couplings may take various structural embodiments without departing from the spirit of the invention; therefore, they are schematically represented.

During normal operation, relay 43 is positioned as shown in FIGURE 1. Consequently, current flows through fuse 70 and coil 72. This current flow closes contacts 76 which, in turn, close contacts 16a to allow actuation of the motor 10. It is appreciated that other starting contacts may be utilized so that the contacts 16a form only a protector for motor 10 and the remaining components of the electrical system. The current flow through fuse 70 is limited by the impedance of coil 72 and the current is not sufficient to cause destruction of the fuse.

When over-voltage is imposed on leads 14, 15 a spark is created across one or more of the spark gaps. This causes actuation of relay 43 which is held in the downward position by tip 46. Normally, closed contacts 50 are opened and coil 72 is de-actuated. This opens contacts 76 and, in turn, opens contacts 16a to de-energize motor 10. Simultaneously with an opening of contacts 50, contacts 54 close. This immediately places fuse 70 in a circuit directly across power lines $L_1$, $L_2$. The fuse is immediately destroyed and an open circuit exists between lines 60, 62. With this open circuit, closing of contacts 50 by manually resetting relay 43 will not actuate relay 74. Consequently, the only way that the contacts 16a can be again closed to actuate motor 10 is by replacing the fuse 70. This can be accomplished only by replacing the container 80 including the spark gap forming elements. In this manner, each actuation of the spark gap surge protector requires the replacement of container 80 before the motor 10 can be reenergized. This is a substantial advance over known spark gap surge protectors because the surge protector cannot be actuated by a simple replacement of a fuse or manual resetting of the hold-out relay. The present invention provides a positive protection against an operator inadvertently actuating the power system with a defective spark gap surge protector in the power system.

The present invention has been described in connection with certain structural embodiments; however, various changes may be made in these embodiments without departing from the intended spirit and scope of the present invention as defined in the appended claims.

Having thus described our invention, we claim:

1. In a high frequency power system including a high frequency power source having a frame, a load circuit connected onto said power source by a pair of power leads and means for preventing damage from over-voltage between said leads and said frame, said means comprising elements forming a spark gap between each of said leads and said frame and a means responsive to current flow across at least one of said spark gaps for de-energizing said power source, the improvement comprising: a disposable container removably secured with respect to said power source, said spark gap forming elements being permanently housed within said container, a destructive fuse means for blocking energization of said power source when said fuse means is destroyed, means for destroying said fuse means in response to current flow across one or more of said spark gaps and said fuse means being permanently affixed with respect to said container, said destroying means including an actuable means operated in response to current flow across one or more of said spark gaps, a line connected across points of high potential, and circuit means connecting said high potential line directly across said fuse means upon operation of said actuable means whereby said fuse means is destroyed.

2. In a high frequency power system including a high frequency power source having a frame, a load circuit connected onto said power source by a pair of power leads and means for preventing damage from over-voltage between said leads and said frame, said means comprising elements forming a spark gap between each of said leads and said frame and a first means responsive to current flow across at least one of said spark gaps for de-energizing said power source, the improvement comprising: a destructible fuse, a disposable structural member for permanently securing said fuse and said spark gap forming elements, means removably securing said disposable member with respect to said power source, said fuse blocking energization of said power source when it is destroyed, and means for destroying said destructible fuse upon current flow across one or more of said spark gaps, a relay means having a first set of contacts for de-energizing said power source and a second set of contacts for passing a destructive current through said fuse, said first means including a means for actuation of said relay means upon current flow across one or more of said spark gaps whereby said first and second contact sets are actuated and said power source is de-energized and said fuse is destroyed.

3. The improvement as defined in claim 2 wherein actuation of said relay opens said first set of contacts and closes said second set of contacts, said first set of contacts is in series in a first line, said second set of contacts is in series in a second line, said first line including a high impedance, and said fuse being in series with both said first line and said second line whereby a higher current flows through said fuse when said second set of contacts is closed than when said first set of contacts is closed.

4. In a high frequency power system including a high frequency source having a frame, a load circuit connected onto said power source by a pair of power leads and means for preventing damage from over-voltage between said leads and said frame, said means comprising elements forming a spark gap between each of said leads and said frame and a first means responsive to current flow across at least one of said spark gaps for de-energizing said power source, the improvement comprising: a destructible fuse, a disposable structural member for permanently securing said fuse and said spark gap forming elements, means removably securing said disposable member with respect to said power source, said fuse blocking energization of said power source when it is destroyed, and means for destroying said destructible fuse upon current flow across one or more of said spark gaps, said fuse destroying means being a latching relay, means for actuating and latching said relay into a fuse destroying position upon flow of current across said spark gap and a manual reset mechanism for displacing said relay from said fuse destroying position.

5. In a high frequency power system including a high frequency source having a frame, a load circuit connected onto said power source by a pair of power leads and means for preventing damage from over-voltage between said leads and said frame, said means comprising elements forming a spark gap between each of said leads and said frame and a first means responsive to current flow across at least one of said spark gaps for de-energizing said power source, the improvement comprising: said current responsive means being a relay movable between a first position for de-energizing said power source and a second position for energizing said power source, means responsive to current flow across at least one of said spark gaps for shifting said relay into said first position and a manual reset means for shifting said relay into said second position.

References Cited

UNITED STATES PATENTS

| | | | |
|---|---|---|---|
| 1,859,377 | 5/1932 | Boudion | 317—66 X |
| 2,271,693 | 2/1942 | House | 317—66 X |
| 2,817,793 | 12/1957 | Tudbury et al. | 317—13 |

MILTON O. HIRSHFIELD, *Primary Examiner.*

J. D. TRAMMELL, *Assistant Examiner.*